(12) United States Patent
Laltoo

(10) Patent No.: US 6,438,851 B1
(45) Date of Patent: Aug. 27, 2002

(54) CIRCULAR SAW CUTTING AID

(76) Inventor: Lev Laltoo, 1633 Carleton St., Berkeley, CA (US) 94703

( * ) Notice: Subject to any disclaimer, the term of this patent is extended or adjusted under 35 U.S.C. 154(b) by 0 days.

(21) Appl. No.: 09/553,650

(22) Filed: Apr. 21, 2000

(51) Int. Cl.$^7$ .............................. B23D 47/02; B27B 9/04
(52) U.S. Cl. .............................. 30/371; 30/373; 30/374; 83/745
(58) Field of Search .......................... 30/371, 372, 373, 30/374; 83/481, 743, 745, 574, 588

(56) References Cited

U.S. PATENT DOCUMENTS

| | | | |
|---|---|---|---|
| 1,881,295 A | * | 10/1932 | Porcello |
| 2,800,933 A | * | 7/1957 | Michael |
| 3,045,724 A | * | 7/1962 | Mitchell |
| 3,903,774 A | * | 9/1975 | Stinson |
| 4,128,940 A | * | 12/1978 | Ong |
| 4,335,512 A | * | 6/1982 | Sheps et al. |
| 4,453,312 A | | 6/1984 | Nishioka |
| 4,483,071 A | | 11/1984 | te Kolste |
| 4,602,435 A | | 7/1986 | Nishioka |
| 4,777,726 A | | 10/1988 | Flowers |
| 4,945,799 A | * | 8/1990 | Knetzer |
| 5,566,456 A | * | 10/1996 | Sawyer, Jr. |
| 5,649,366 A | * | 7/1997 | Schieman |
| 5,678,314 A | * | 10/1997 | Braunbach et al. |
| 5,815,931 A | * | 10/1998 | Cleveland |
| 5,901,450 A | | 5/1999 | James |

* cited by examiner

Primary Examiner—Boyer Ashley
Assistant Examiner—Thomas J Druan, Jr.
(74) Attorney, Agent, or Firm—David T. Bracken

(57) ABSTRACT

The present invention comprises a circular saw aligning device which is not only easily releaseable but also entirely removeable from functioning engagement with either a specially made or prior art portable circular saw. An abutting assembly of the device rotates from an engaging position to a non-engaging position so the saw can be used without interference. This rotation is also the first step in removing the device entirely from the saw.

10 Claims, 7 Drawing Sheets

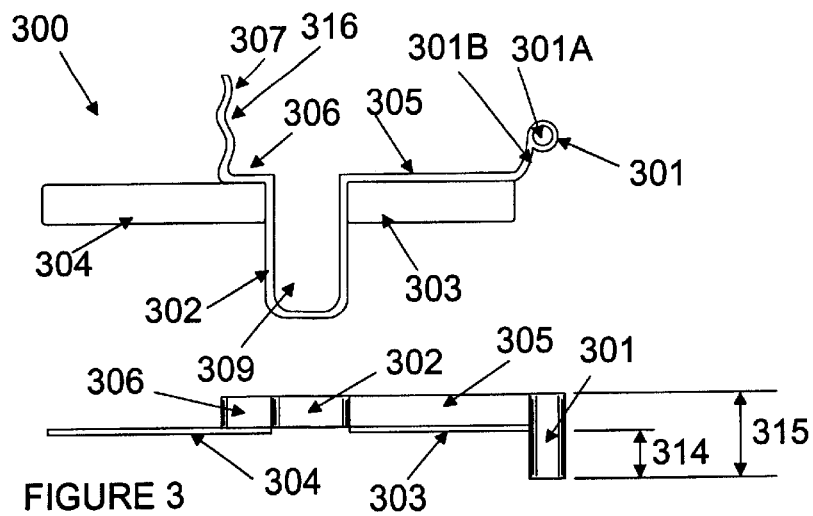
FIGURE 2
FIGURE 3
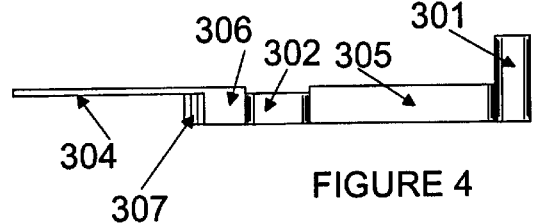
FIGURE 4
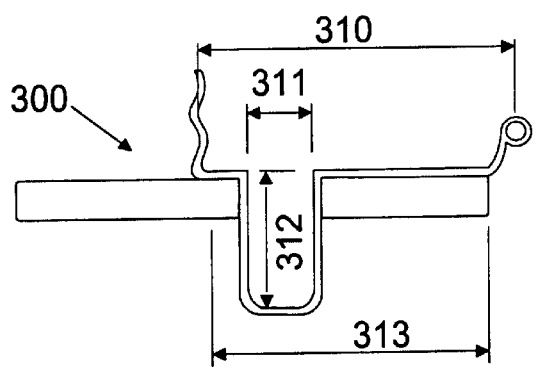
FIGURE 5
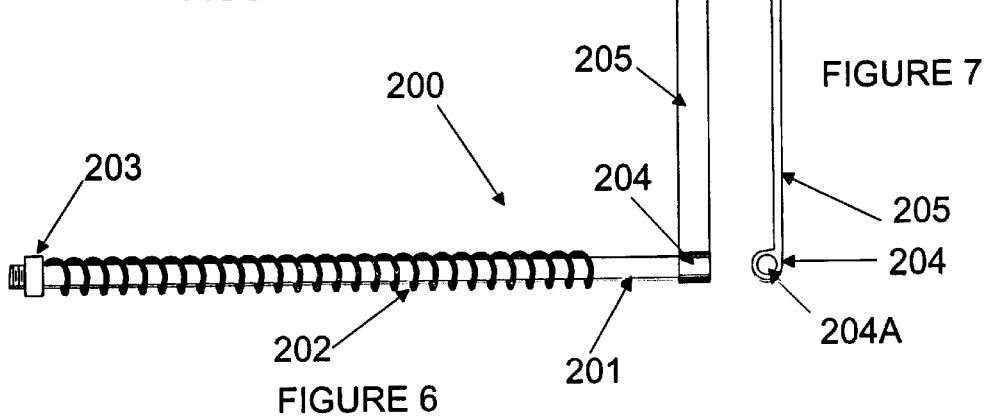
FIGURE 6
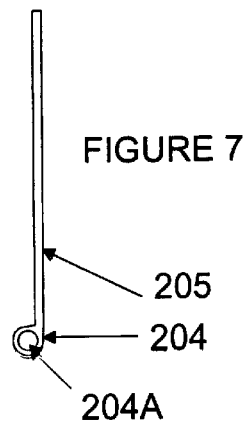
FIGURE 7

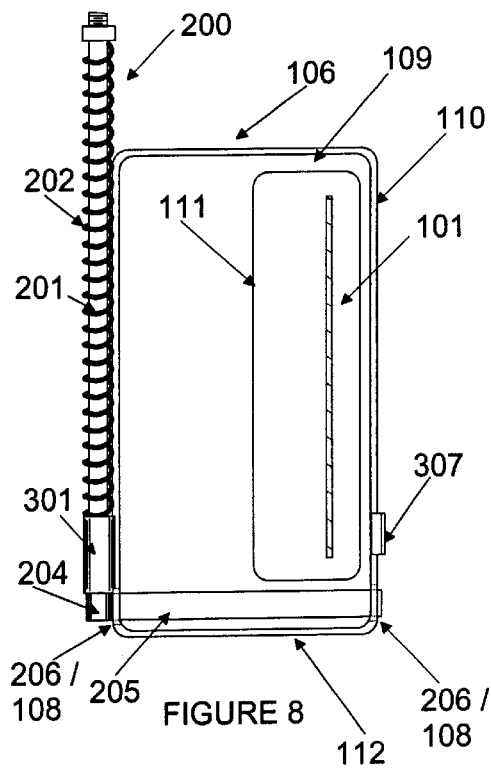
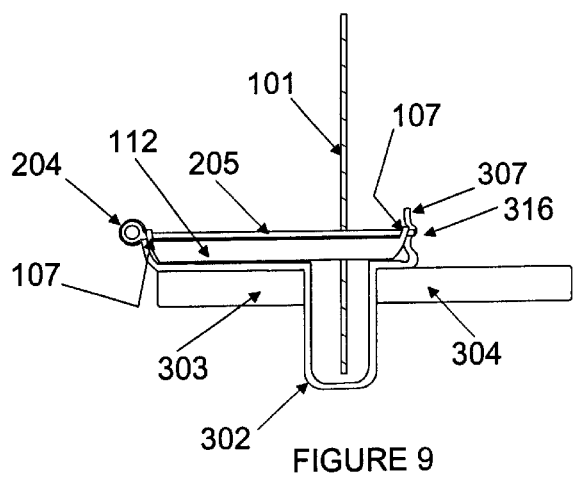
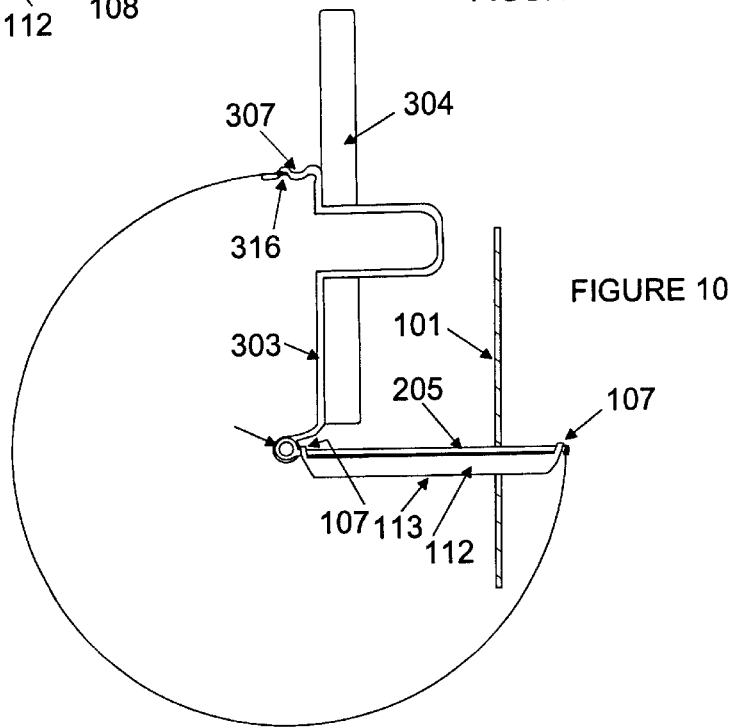

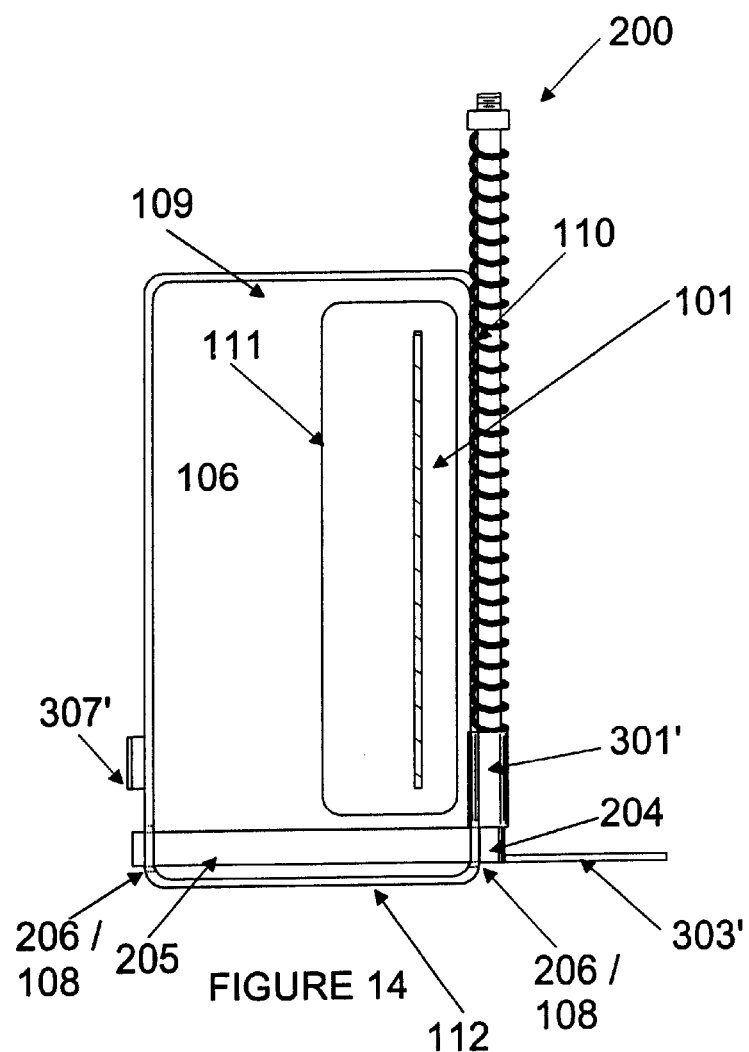
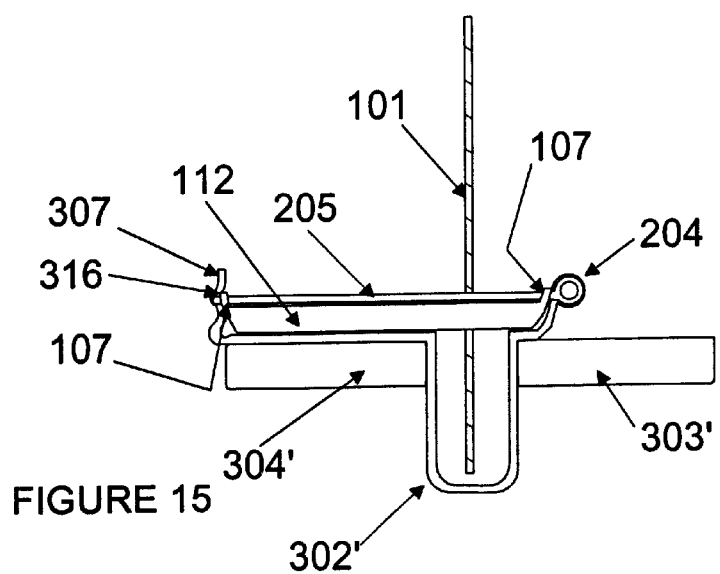

CIRCULAR SAW CUTTING AID

BACKGROUND OF THE INVENTION

The present invention relates to cutting aids for portable circular saws. U.S. Pat. No. 5,901,450A discloses a rip guide for a circular saw. The circular saw includes a housing including a shoe plate for supporting the circular saw on a workpiece. The circular saw also includes a motor supported by the housing and a saw blade rotatably driven by the motor about an axis. The saw blade is operable to cut the workpiece in a cutting direction. The guide comprises a support member supported on the housing; an arm supported by the support member and extending from the housing in the cutting direction; and a guide member supported by the arm so that the guide member is pivotally supported by the support member. The guide member extends from the housing in the cutting direction. The guide member includes first and second guide surfaces for selectively guiding the circular saw relative to first and second edges, respectively, of the workpiece.

U.S. Pat. No. 4,777,726 discloses a guide for use with a portable circular hand held power saw in making square cuts across a board or plank. A spring biased hinged flap slidably secured beneath the base plate of the saw bears against the edge of the plank throughout the course of the cut, maintaining the perpendicular orientation of the saw relative to the work piece.

U.S. Pat. No. 4,483,071 discloses a saw guide for a power-driven circular hand saw machine or jig saw machine which consists of a bar member provided with a graduation and attachable to the base plate of the machine perpendicular to the base plate and of a gauge member, which gauge member is shiftable along and fixable on the bar member by means of a sliding member.

U.S. Pat. No. 4,453,312 discloses a saw aligning mechanism or assembly in the preferred structure of this disclosure is supported on a power hand saw by a support. The saw comprises a motor, a handle, a blade and a trigger switch. The assembly comprises the support, an elongated shaft and an aligning device or plate. The shaft extends longitudinally in substantially the same direction as the cutting movements of the saw and is connected to the support. The aligning plate extends substantially transversely to the shaft for butting against an object to be cut. The aligning plate is connected to the shaft by a bore which allows the aligning plate to slide and pivot on the shaft. A second form of the disclosure presents an assembly wherein the elongated shaft is slidably connected to the support.

The prior art devices are notable for their need for a substantial change in the base plates of the saws to which they are to accommodate the function of aligning the saw blade to a cutting piece. There is a need for a device which is substantially simpler, thereby less expensive, and immediately and removeably attachable to prior art saws.

SUMMARY OF THE INVENTION

The present invention comprises a circular saw aligning device which is not only easily releaseable but also entirely removeable from functioning engagement with either a specially made or prior art portable circular saw. An abutting assembly of the device rotates from an engaging position to a non-engaging position so the saw can be used without interference. This rotation is also the first step in removing the device entirely from the saw.

BRIEF DESCRIPTION OF THE DRAWINGS

FIGS. 2–5 are respectively back, bottom top and back views of an abutting piece of the invention device.

FIGS. 6 and 7 are respectively top and front views of a mounting and spring resistance assembly of the invention device.

FIGS. 8–10 show respectively top, front engaged and front disengaged views of the abutting piece and mounting and spring assembly engaged with a generalized support plate for a portable circular saw as in FIG. 1.

FIGS. 14 and 15 are top and front views of an alternate embodiment of the invention device with respect to mounting of the device on a saw plate edge nearest the saw blade.

DETAILED DESCRIPTION OF THE INVENTION

The invention is now discussed with reference to the Figures. The item and aspect numbers of the Figures identify substantially the same item or aspect when duplicated between the Figures.

Figure 1:
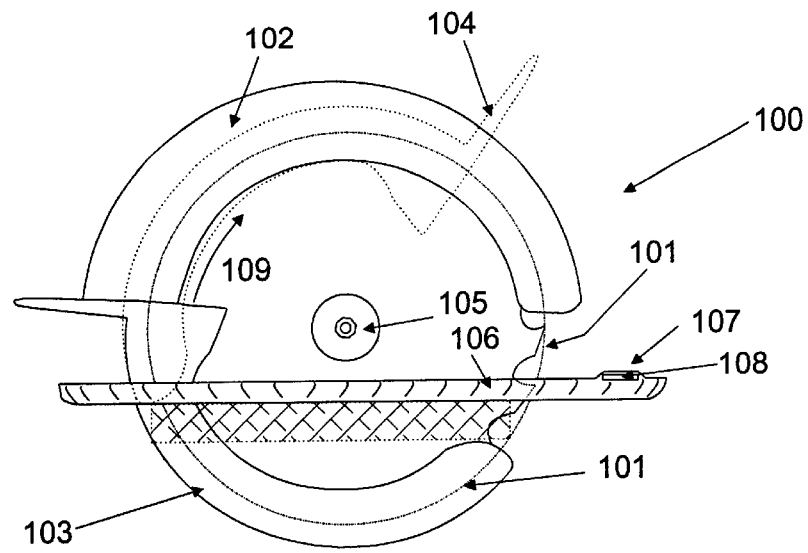
FIG. 1 is a side view of a generalized portion of a portable circular saw showing in broken lines an exemplary piece of workpiece wood cut in two.

FIG. 1 is a side view of a portable circular saw 100 without the drive motor to enhance the understanding of the operation and engagement of the invention device. It is well known in the art (which cited prior art is incorporated herein) that portable circular saws comprise a wide variety of motors and casings (and their engaging connections,) for driving the saw blade 101. The location, size and engagement or angling features of such saw motors to a generalized saw 100 affect the choice of location of the invention device 200/300 on the right side or left side of the saw plate 106. Saw 100 comprises a blade 101 engaged to a motor at connection 105 and having an upper protector 102 and lower protector 103, protector 103 being adapted to rotate clockwise in FIG. 1 to position 104 for advance of a workpiece (shown in broken lines slideably abutting the bottom plate 106. A standard feature on most prior art portable circular saws are, extending from the upper edge of plate 106, a pair of upper edge extensions 107 having slots 108. As disclosed in the prior art above, the extensions and slots are provided to allow attachment for devices such as ripping guides.

Figure 1A:
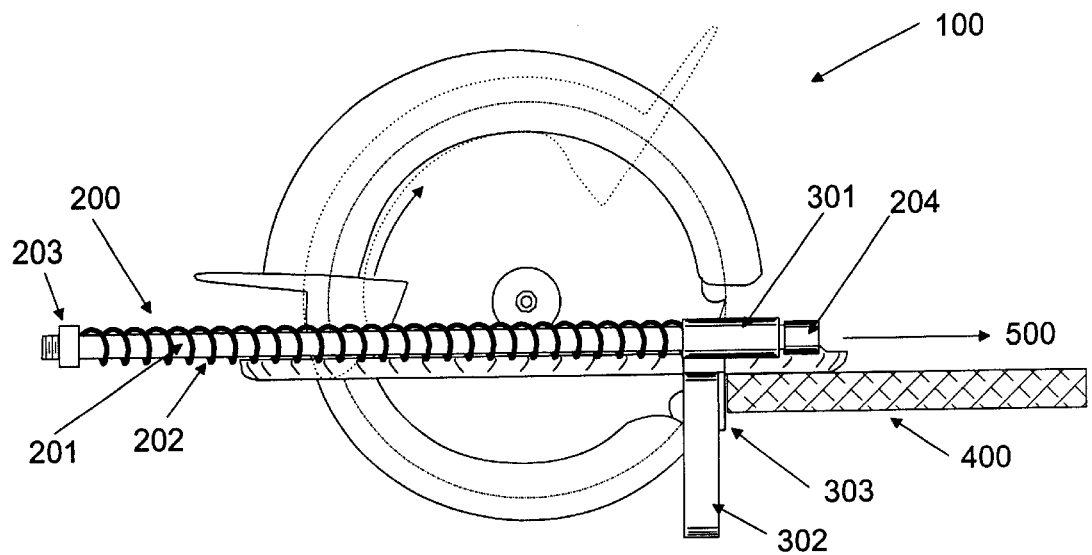
FIGS. 1A, 1B and 1C are the side views of FIG. 1 with the invention device engaged with the saw and the workpiece in respectively first abutting, second part sawn and third completely sawn positions.
Figure 1B:
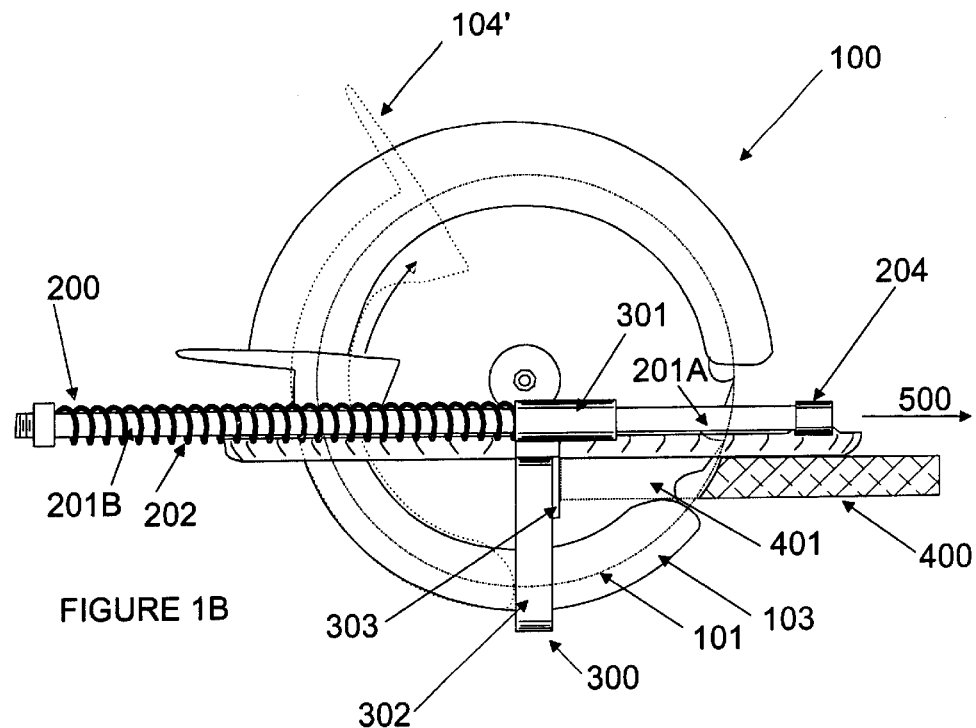

As shown in FIG. 1A, in one embodiment, the invention device 200/300 comprises an assembly 200 connected with a piece 300, the two joined devices held in rigid one dimensional motion alignment with plate 105 by insertion of an extension of shaft support 204 through slots 108 and additional securement as described below. Assembly 200 comprises a shaft 203 and spring 202 releaseably having shaft 203 supportingly in its axis. Threaded shaft and nut combination 203 retains spring 202 on shaft 201 whereby the other end of spring 202 abuts a part of piece 300, i.e., a back end of shaft slider 301. Slider 301 comprises a hole just larger than shaft 201 such that slider 301 creates a connection to shaft 201 whereby piece 300 may rigidly be moved only in the direction of the axis of shaft 201 by pressure against a first abutting plate 303 by a workpiece 400. This is generally accomplished by manual pushing of the circular saw by its handle in the direction 500 such that blade 101 saws workpiece 400 as in FIGS. 1B and 1C. Loop 302 is formed such that it blade 101 may pass through it, as shown in FIG. 1B wherein the lowest edge of blade 101 is effectively substantially above an inside bottom section of loop 302. Loop 302 is adapted to either allow passage through of protector 103 such that its rotation toward the direction of location 104 is accomplished by engaging the bottom or leading edge of workpiece 400 or by engaging a back edge of loop 302 such that protector 103 is caused to rotate without engaging the workpiece, as in FIG. 1B wherein protector 103 will be rotated to location 104' (as shown in broken lines).

Figure 1C:
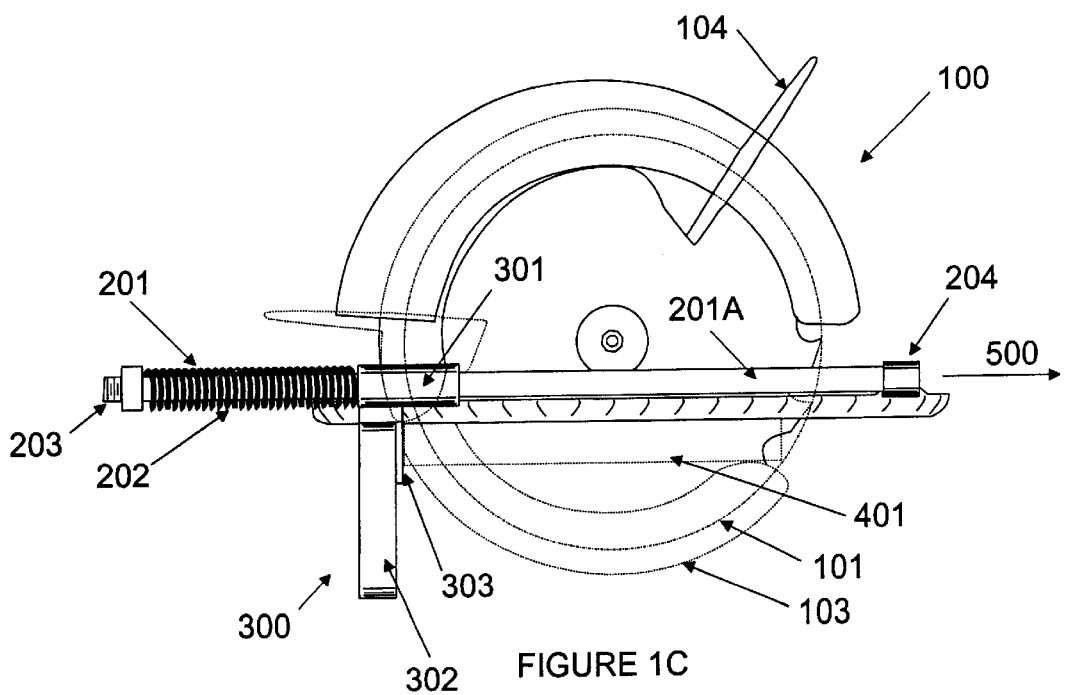

FIGS. 1A, 1B and 1C show invention device 200/300 with saw 100 engaging and sawing through a workpiece 400 by moving in direction 500. FIG. 1B shows that as piece 300 is moved directly opposite and lightly opposes motion in direction 500, workpiece 400 is sawn through in portion 401 and whereby its bottom side causes a slight rotation of protector 103. In that process, shaft 201 is shown as shaft portions 201A and 201B, portion 201A exposed as slider 301 causes compression of spring 202 within a length of portion 201B.

FIG. 1C shows a fully sawn workpiece portion 401 in broken lines, whereby piece 300 is at a furthest compression position whereby spring 202 is substantially compressed on portion 201B. The motion of the saw 100 and device 200/300 in direction 500 has caused plate 106 to slide over a top surface of workpiece 400 and caused the workpiece to engage first abutting plate 303 and a second abutting plate 304 in a manner such that for the entire series of actions in FIGS. 1A–1C plates 303 and 304 are maintained substantially normal to direction 500.

FIGS. 2–5 disclose a preferred embodiment of the piece 300. Plates 303 and 304 are attached to a continuous plate beginning at the formation of slider 301 about hole 301A, extending down via portion 301B to support 305, which in turn connects to loop 302 and returns to substantially the level of support 305 to form support 306, therefrom extending upward to form saw plate engagement piece 307 having a notch 316 which releaseably and slideably engages a long edge of plate 106 opposite a plate side associated with shaft 201 and spring 202. Loop 302 forms a space 309 through which at least blade 101 may pass in the steps shown in FIGS. 1A–1C.

Loop 302 defines a width 311 and height 312. Height 312 is variable depending on the construction of the several saw manufacturers or blade 101 diameters, although a typical 7 inch blade 101 will preferably have a height 312 of about two and a half inches and a width 311 of about one inch whereby the protector 103 may usually pass untouched by loop 103. In this embodiment, loop 103 is a required rigid attachment between plates 303 and 304, without which the invention would be ineffective. The prior art devices in this art fail to effectively and rigidly connect two leading plates 303 and 304 such that the two plates slideably abut a leading edge of a workpiece 400 in the sawing operation to force the blade 101 into a necessarily normal angle to the leading edge of the workpiece 400. This enforced relationship allows the user to obtain a square cut across the workpiece with respect to the leading edge of the workpiece. The attachment and sliding means for loop 302 and plates 303 and 304 comprise a wide selection of such pieces and assemblies. The present specific example of such means are a particularly low cost, easily removeable and easily understood set of pieces and assemblies.

FIGS. 2–4 show views of slider 301 wherein it has a length 315 of about 1–3 inches or more, the length of which is determined with reference to that required to maintain a rigid alignment of plates 303 and 304 as described above. The same such considerations are true for the diameter of shaft 201 and hole 301A. The relationship of slider 301 to plate 305 is determined by piece 301B, whereby the necessary angle and distance therefore is determined by the axis location of slider shaft 201 with respect to the bottom plate 106 of the circular saw. An alternate embodiment of the present invention will permit mounting the shaft 201 directly above a longitudinal edge portion of plate 106, i.e., where the plate 106 comprises sufficient space on that edge portion on a right or left side such that, except for a curved portion of piece 301B, spring 202 and shaft 201 and piece 300 will be out of the way of workpiece portions of other objects that abut or drag along that longitudinal edge. Thus, the distance 310 in FIG. 5 would be reduced for such an embodiment and piece 301B would be curved in a C- or U-shape to reach a protectively mounted shaft 201 and spring 202. Alternately, it may be desireable to mount shaft 201 such that it is relatively more distal to the right or left longitudinal edge of plate 106. Where a circular saw comprises a small plate 106 relative to its motor and other necessary attachments so that protective mounting is impossible or inconvenient, the invention assembly 200 may be attached to a plate 106 such that the axis of shaft 201 lies parallel to the plane of blade 101 although at a greater distance from the longitudinal edge of plate 106 than the embodiments of the Figures. In such an embodiment, distance 310 will be greater than that shown in FIG. 5.

In all such embodiments, however, it is critical that distance 313 be maintained as to the distal ends distance for plates 305 and 306. This distance is approximately that of the width of the plate 106, such that a support surface is created on which the bottom surface of plate 10 will slide against with ease. In a preferred embodiment, plate 306 is extended upwards to form slideable notch piece 307 with notch 316. Notch 316 is where a longitudinal edge of plate 106 opposing the longitudinal edge near the mounting of shaft 201 is slideably secured such that that edge is urged into notch 316 by the opposing action of the mounting of piece 300 at slider 301 to shaft 201. It has been found that although the notch 316 is shallow enough to permit easy release from engagement with that plate 106 edge and that piece 300 slides easily along that edge constantly securingly engaging it, the preferred piece 307 provides very secure engagement to that edge so that even in heavy usage plates 305 and 306 do not substantially fall away from the bottom of plate 106 and rotate about the axis of shaft 200.

Plate 304 as shown in FIGS. 2–5 is shown in general length ratio relationship to plate 303 of about 1.3 to 1, although that ratio may range from 2:1 to 1:5. The length of plate 303 preferably extends to about the same length as plate 305 such that the workpiece abutting surface is about as wide as the plate 106 width for that embodiment.

FIGS. 6 and 7 show assembly 200 having in addition to the above described aspects an support bar 205 integral with shaft 201 support 204 with hole 204A for securing therein shaft 201. Bar 205 is adapted to be insertable into a shaft 201 side slot 108 and extending therefrom to the opposite side slot 108 such that the majority support and attachment of the invention device is established with respect to the circular saw. It has been found that securing bar 205 in slots 108 in combination with the slideable securement of piece 307 to a plate 106 edge and contact of plates 305 and 306 are sufficient invention device to circular saw connection to accomplish the objects of the invention. Thus, the user with a saw 100 and an embodiment of the invention device as shown in FIGS. 2–7 would first unscrew the nut from the shaft at portion 203 and remove the spring 202. Second, slider 301 is inserted onto shaft 201 such that section 314 (FIG. 3) abuts shaft support 204. Third, spring 202 is returned to shaft 201 and the nut returned to portion 203 as in FIG. 6. Fourth, bar 205 is inserted into slots 108 as in FIGS. 8–10 and piece 300 is rotated about shaft 201 axis as in FIG. 10 such that the plate 106 edge opposite shaft 201 is spring-wise urged into notch 316 of piece 317 and securing interfaces 206/108 are established for bar 205.

Figure 11:
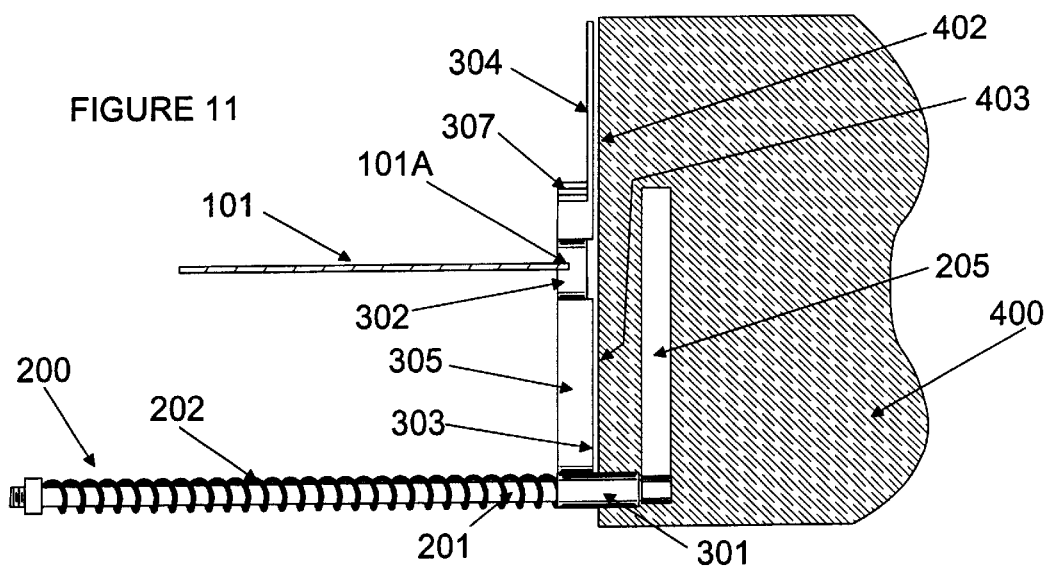
FIGS. 11–13 show top views of the side views of FIGS. 1A, 1B and 1C respectively showing only the saw blade of the circular saw and the workpiece, such that an essential part of the operation of the invention device is more easily understood.
Figure 12:
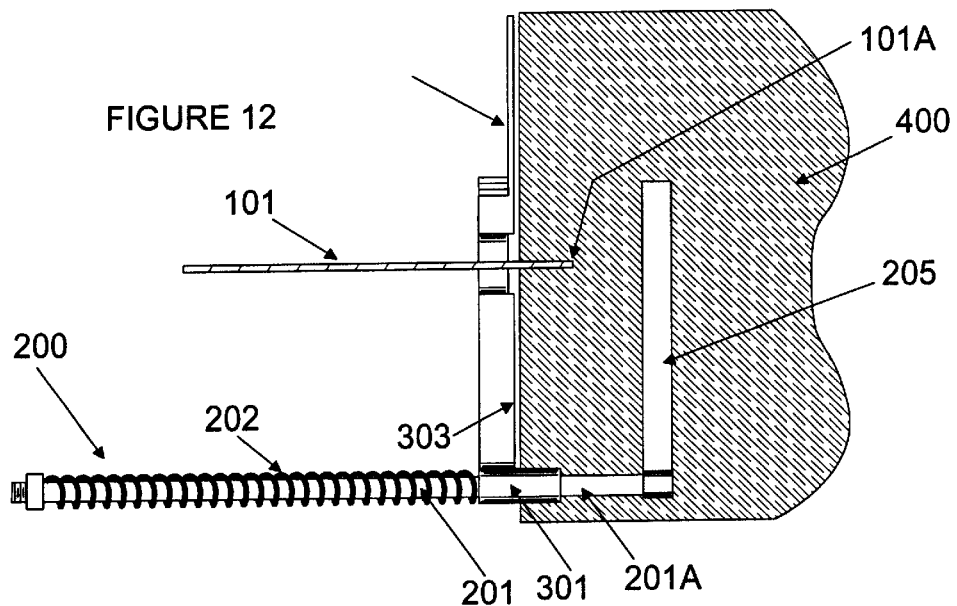
Figure 13:
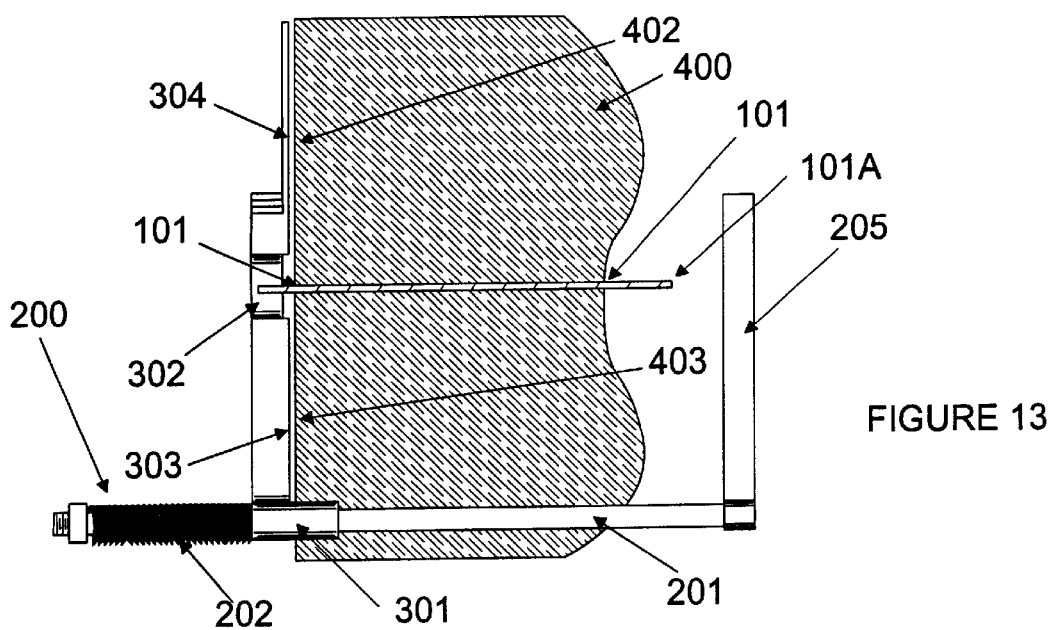

For saw 100, FIGS. 8–10 show only plate 106 and blade 101 so that the workpiece-effective portions of the invention are more clearly indicated. FIGS. 11–13 eliminate the plate 106 of FIGS. 8–10 to show how a workpiece 400 is sawn in a top view of the invention device attached to a circular saw. Plates 303 and 304 of FIGS. 11–13 respectively abut leading edges 403 and 402 as in FIGS. 1A–1C.

It is surprising that the relatively long length of shaft 205 required for sawing through of workpiece 400 is accomplished with such minimal invention device to saw contact and support. It will be possible to accomplish the objects of the invention with alternate embodiments than those shown in FIGS. 1–13. Shaft support 204 having a hole 204A may be welded, bolted or otherwise equivalently attached to a top surface or edge of plate 106, such that a receiving bore is established that will effectively support shaft 201 for the objects of the present invention. It is intended that shaft support 204 comprise a wide range of means and assemblies to accomplish shaft 201 support. In one embodiment therefore, shaft 201 may comprise an enlarged end distal to portion 203, such enlarged end abutting a leading edge opening of shaft support 204 so that shaft 201 can be removed from hole 204A and saw 100 requires only a bolt-wise removable or welded shaft support 204 on saw 100 while the rest of the invention device is easily removable. Or shaft 201 can be welded or pressure fit to shaft support 204 in welded or other connection with a top or edge of plate 106, thereby allowing removal of spring 202 and piece 300 via slider 301.

FIGS. 14 and 15 show an alternate embodiment of the invention device. Edge 110 is established as the above described shaft edge along which is oriented shaft 201. Thus, shaft 201 may be maintained and supported on the plate 106 longitudinal edge closest to blade 101. Plates 303' and 304' are adapted to effect equivalent workpiece abutment as provided by plates 304 and 303 in a previous embodiment. The embodiment of FIGS. 14 and 15 introduces to the user's visual field near blade 101 the shaft 201 and spring 202 aspects of the invention device. Thus, the opposite edge mounting of the invention device as in FIGS. 8–10 will be more preferable in some cases than that of FIGS. 14 and 15.

The above design disclosures present the skilled person with considerable and wide ranges from which to choose appropriate obvious modifications for the above examples. However, the objects of the present invention will still be obtained by the skilled person applying such design disclosures in an appropriate manner.

I claim:

1. A cutting guide for a portable circular saw, the saw comprising a bottom plate with front, back and two side edges, with a circular saw blade extending therethrough from a top surface to a bottom surface, the invention comprising:

(a) support means for a shaft located on the top surface of the bottom plate and near or on its front edge and a first of the two side edges, the support means adapted to engage and support a shaft extending substantially parallel to the blade from near the front edge toward the back edge to a distal end of the shaft that comprises spring abutting means;

(b) a workpiece abutting piece comprising a slider, which comprises a body piece defining a bore, wherethrough the shaft passes and slidably supports the workpiece abutting piece piece, and is adapted to slide along the shaft to abut the support means, the slider also adapted to rigidly connect with a first bottom plate support, which is connected with a loop, which is connected with a second bottom plate support, which is connected with an edge engaging piece, whereby first and second leading edge plates are mounted to leading edges of the first and second bottom pieces; and (c) the shaft being supportively engaged with the support means and having a spring adapted to abut the slider and the spring abutting means; and (d) the workpiece abutting piece being further adapted such that its first and second leading edge plates are substantially normal to the plane of the saw blade when the first and second bottom plate supports engage the bottom surface of the bottom plate and the edge engaging piece is slideably and supportively engaged with the second side edge, whereby the saw blade is held substantially normal to a leading edge of a workpiece sawn with the circular saw and the cutting guide.

2. The cutting guide of claim 1 wherein one of the side edges is closer to the saw blade than the other side edge.

3. The cutting guide of claim 1 wherein the workpiece abutting piece is adapted to releaseably engage the second side edge at the edge engaging piece.

4. The cutting guide of claim 3 wherein the workpiece abutting piece is, after release of the edge engaging piece to the second side edge, adapted to rotate about the axis of the shaft.

5. The cutting guide of claim 4 wherein the workpiece abutting piece is adapted to rotate about the axis of the shaft such that a workpiece may be sawn with the saw blade without contact of the cutting guide with the workpiece.

6. The cutting guide of claim 5 wherein the circular saw comprises a saw blade protector extending through the bottom plate from the top surface to the bottom surface, whereby the loop is adapted to be moved by contact of the workpiece with the leading edge plates past the extension through the bottom surface of the saw blade protector without substantially touching it.

7. The cutting guide of claim 5 wherein the circular saw comprises a saw blade protector extending through the bottom plate from the top surface to the bottom surface, whereby the loop is adapted to be moved by contact of the workpiece with the leading edge plates into contact with bottom surface projection of the saw blade protector such that it rotates upward toward the top surface.

8. The cutting guide of claim 1 wherein the bottom plate defines two or more slots near the front edge, whereby support means comprise a bar adapted to be removeably inserted into at least two of the slots.

9. A cutting guide for a portable circular saw, the saw comprising a bottom plate with front, back and two side edges, with a circular saw blade extending through the bottom plate from a top surface to a bottom surface, the invention comprising:

(a) a shaft assembly having a shaft with a distal end having a spring abutting means, a spring aligned on the shaft and abutting at one end the spring abutting means, a shaft support and support means for supportively engaging the shaft support, whereby the support means are adapted to be located on the top surface of the bottom plate and near its front edge and a first side edge and the shaft is adapted to extend substantially parallel to the blade from near the front edge toward the back edge to the distal end;

(b) a workpiece abutting piece comprising a slider, which comprises a body piece defining a bore, wherethrough the shaft passes and slidably supports the workpiece abutting piece, and is adapted to slide along the shaft to abut the shaft support, the slider also adapted to rigidly connect with a first bottom plate support, which is connected with a loop, which is connected with a second bottom plate support, which is connected with an edge engaging piece, whereby first and second leading edge plates are mounted to leading edges of the first and second bottom pieces;

(c) the workpiece abutting piece being further adapted such that its first and second leading edge plates are substantially normal to the plane of the saw blade when the slider is engaged with the shaft between a front end of the spring and the shaft support, whereby the first and second bottom plate supports engage the bottom surface of the bottom plate and the edge engaging piece is slideably and supportively engaged with the second side edge, whereby the saw blade is held substantially normal to a leading edge of a workpiece sawn with the circular saw and the cutting guide; and (d) the workpiece abutting piece is adapted to releaseably engage the second edge at the edge engaging piece and the workpiece abutting piece is, after release of the edge engaging piece to the second edge, adapted to rotate about the axis of the shaft.

10. The cutting guide of claim 9 wherein one of the side edges is closer to the saw blade than the other side edge.

* * * * *